May 30, 1933.    C. SAURER    1,911,585
RESILIENT SUPPORT

Filed June 3, 1931

INVENTOR
CURT SAURER

BY
Ely & Barrow

ATTORNEYS

Patented May 30, 1933

1,911,585

UNITED STATES PATENT OFFICE

CURT SAURER, OF AKRON, OHIO, ASSIGNOR TO THE FIRESTONE TIRE & RUBBER COMPANY, OF AKRON, OHIO, A CORPORATION OF OHIO

RESILIENT SUPPORT

Application filed June 3, 1931. Serial No. 541,845.

This invention relates to resilient supports such as are used on vehicles for yieldingly supporting a structure carried by the vehicle, to reduce vibration of said structure by insulating it from the vehicle.

The improved support is of primary utility for supporting a load, the thrust of which primarily is downward due to its own weight. It may be used advantageously, for example, with brackets for supporting air compressors beneath train cars; for yieldingly securing a storage battery box to the frame of a motor driven vehicle, and in numerous other similar situations.

The chief objects of the invention are to provide a resilient support of the character mentioned, which will be easy to mount and remove; which will be of simple construction; and which will require little or no alteration to existing structures. Other objects will be manifest.

Figure 1:
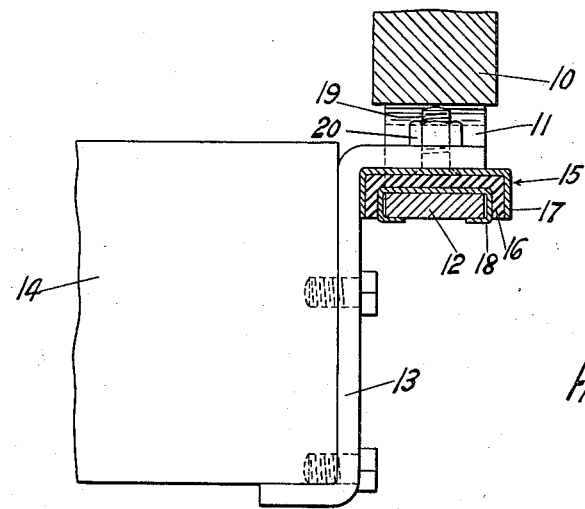
Figure 2:
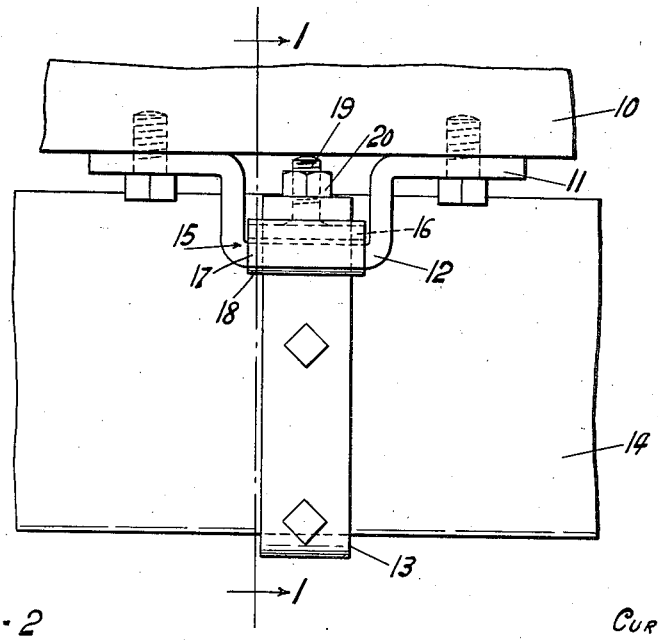

Of the accompanying drawing,

Figure 1 is a vertical section through the improved resilient support and associated structures taken on the line 1—1 of Figure 2; and Figure 2 is an end elevation of the structure shown in Figure 1 as viewed from the right thereof.

Referring to the drawing, 10 is a portion of a vehicle frame, or stringer or similar member on the under side of a vehicle, and 11 is one of a plurality of centrally bowed straps mounted upon said stringer and upon similar stringers adjacent thereto. Supported in the bowed portion 12 of each strap 11 is an angular bracket 13, which, with similar brackets (not shown), supports a structure that is conventionally shown at 14, the specific nature of the structure 14 being immaterial.

The upper end portion of the bracket 13 is bent at right angles so as to extend laterally into the bowed portion 12 of the strap 11, and mounted between the laterally extending portion of the bracket 13 and the bowed portion 12 of the strap is a resilient, non-metallic cushion support generally designated 15. The cushion support 15 is a generally shallow channel or trough-shaped structure comprising a layer of resilient rubber composition 16, and metal facing members 17, 18 vulcanized respectively to the convex and concave faces thereof. The facing 18 consists of soft, pliable metal and extends beyond the lateral margins of the cushion layer 16. A headed and threaded stud or machine screw 19 extends through the metal facing 17, the head thereof being backed by the rubber layer 16.

The resilient support 15 is so constructed that when it is mounted within the bowed portion 12 of the strap 11 it will overlie the edges of the strap, the threaded stud 19 extending upwardly. The laterally extending portion of the bracket 13 is suitably apertured to receive the stud 19, and is secured to the resilient support by a nut 20 threaded onto said stud. The resilient support is secured to the strap 11 by having the lateral extensions of its metal facing 18 bent over onto the bottom face of the bowed portion 12 of the strap.

The improved resilient support is of simple construction, and is especially applicable in situations where the major vibration thrust is downward only. It is so shaped however, as to yieldingly resist and dampen horizontal vibrations. It is easily and quickly mounted and requires little or no alteration to existing structures.

Modification may be resorted to within the scope of the appended claims which are not limited wholly to the specific construction shown and described.

What is claimed is:

1. In a resilient support adapted to be mounted between two relatively movable members, the combination of a resilient rubber cushion of shallow channel shape adapted to embrace the top and sides of one relatively movable member, a facing of pliable metal attached to the inner face of said channel cushion and having portions extending beyond the legs of the cushion adapted to be folded onto the bottom of said relatively movable member, a relatively stiff metal plate attached to the outer face of the channel cushion, and means for securing said stiff metal plate to the other relatively movable member.

2. A combination as defined in claim 1 in which the relatively stiff metal plate is coextensive with the outer surface of the channel cushion.

In witness whereof I have hereunto affixed my signature this 26th day of May, 1931.

CURT SAURER.